United States Patent [19]
White, Jr.

[11] 3,843,636

[45] Oct. 22, 1974

[54] 1-(5-(P-METHOXYPHENYL)FUR-FURYLIDENE)AMINO) HYDANTOIN

[75] Inventor: Ralph L. White, Jr., Norwich, N.Y.

[73] Assignee: Morton-Norwich Products, Inc., Norwich, N.Y.

[22] Filed: Jan. 25, 1974

[21] Appl. No.: 436,466

[52] U.S. Cl. .............................. 260/240 G, 424/274
[51] Int. Cl. ............................................. C09b 23/00
[58] Field of Search .................... 260/240 A, 240 G

[56] References Cited
UNITED STATES PATENTS
3,415,821  12/1968  Davis et al. ..................... 260/240 G

OTHER PUBLICATIONS

Synder et al., J. Med. Chem. Vol. 10, pages 807 to 810, (1967). 58, pages 1,528 to 1,537, Burger, Medicinal Chemistry, Part II, Third Ed., Chapter 58, pages 1,528 to 1,537, Wiley–Interscience, N.Y. (1970).

Primary Examiner—John D. Randolph
Attorney, Agent, or Firm—Anthony J. Franze

[57]  ABSTRACT

The title compound is a useful muscle relaxant.

1 Claim, No Drawings

1-(5-(P-METHOXYPHENYL)FURFURYLIDENE)AMINO) HYDANTOIN

This invention is concerned with the chemical compound 1-{[5-(p-methoxyphenyl)furfurylidene]amino} hydantoin. This compound possesses pharmacological activity. In particular it exhibits skeletal muscle relaxant activity when administered perorally or intravenously to warm-blooded animals. Thus when administered intravenously in a pharmaceutically acceptable solvent, such as aqueous sodium hydroxide-mannitol solution, at a dose of about 100 mg./kg. to rats, inhibition of the twitch response of the gastrocnemius muscle is elicited.

This compound is preferably prepared in accordance with the following example:

A mixture of 62 g (0.50 mole) of p-anisidine in 50 ml of water and 135 ml of concentrated hydrochloric acid was diazotized by dropwise addition of 36 g (0.52 mole) of sodium nitrite in 100 ml of water, with the pot temperature kept below 10°. Thirty minutes after completing the addition, the solution was filtered and added to 61.5 g (0.64 mole) of furfural in 200 ml of water, followed by addition of 23 g of cupric chloride dihydrate in 100 ml of water. The stirred mixture was heated at 50°–60° for four hours then stirred overnight without heating. The solution was extracted with two 500 ml portions of ether, and the ether solution was washed with 200 ml of water, and two 200 ml portions of 5 percent sodium hydroxide solution. The dried (sodium sulfate) solution was concentrated to an oil which was dissolved in 400 ml of ethanol. The cooled alcohol solution was filtered (Note 1) and to the filtrate was added 46 g (0.30 mole) of 1-aminohydantoin hydrochloride in 150 ml of water. After 2 hours the solid was collected, washed with 100 ml of ethanol and recrystallized by suspending the solid in 500 ml of dioxane and adding 30 ml of dimethylformamide. After 5 days 11.75 g of product was collected (8%), m.p. 266°–269°.

Anal. Calcd. for $C_{15}H_{13}N_3O_4$: C, 60.20; H, 4.38; N, 14.04.

Found: C, 60.01; H, 4.35; N, 14.09.

What is claimed is:

1. 1-{[5-(p-Methoxyphenyl)furfurylidene]amino} hydantoin.

* * * * *